United States Patent
Harmuth

[15] 3,678,204
[45] July 18, 1972

[54] SIGNAL PROCESSING AND TRANSMISSION BY MEANS OF WALSH FUNCTIONS

[72] Inventor: Henning Friedolf Harmuth, Bethesda, Md.

[73] Assignee: International Telephone and Telegraph Corporation, Nutley, N.J.

[22] Filed: Oct. 26, 1970

[21] Appl. No.: 84,025

[52] U.S. Cl. ....................179/15 BC
[51] Int. Cl. ....................H04j 3/04
[58] Field of Search ....................179/15 BC

[56] References Cited

UNITED STATES PATENTS 3,470,324 9/1969 Harmuth....................179/15 BC
3,522,383 7/1970 Chang....................179/15 BC

*Primary Examiner*—Ralph D. Blakeslee
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

In the transmission by carrier waves a plurality of signals are produced and each multiplied by one of 12 Paley functions derived from a Hadamard matrix of rank 12. The resulting signals are added to form a multiplexed signal. The multiplexed signal is frequency limited by sampling it with a trigger function and passing the samples through a bandpass filter. Reconversion of the multiplex signal is accomplished at the receiver.

4 Claims, 14 Drawing Figures

INVENTOR
HENNING F. HARMUTH
BY
Stephen A. Young
ATTORNEY

INVENTOR
HENNING F. HARMUTH
BY Stephen A. Young
ATTORNEY

INVENTOR
HENNING F. HARMUTH
BY Stephen A. Young
ATTORNEY

Patented July 18, 1972

3,678,204

8 Sheets-Sheet 5

INVENTOR
HENNING F. HARMUTH

BY Stephen A. Young
ATTORNEY

INVENTOR
HENNING F. HARMUTH
BY Stephen C. Young
ATTORNEY

INVENTOR
HENNING F. HARMUTH
BY Stephen A. Young
ATTORNEY

Patented July 18, 1972 3,678,204

8 Sheets-Sheet 8

INVENTOR
HENNING F. HARMUTH
BY Stephen A. Young
ATTORNEY

SIGNAL PROCESSING AND TRANSMISSION BY MEANS OF WALSH FUNCTIONS

BACKGROUND OF THE INVENTION

This invention relates to a system for transmitting information.

In order to transmit several messages over a line or a radio link, a time or frequency multiplex system has been used as the carrier.

In the time multiplex system shown in FIG. 1, the transmitter $I_a$ at the transmission point are connected through a revolving transmission switch $S_S$ at the sending station one after another for short periods of time to a transmission line. At the receiving station, a transmission line is connected successively to the individual receivers $E_a$ by a receiver switch $E_S$ rotating in synchronism with the sending switch.

The time-multiplex system can be represented as a carrier system with time divisions, as in FIG. 1*a*. The carriers for the individual messages are represented one below the other. During the contact times of the individual signals emitters, the carrier can be represented by the value 1, since the information function $f(t)$ remains constant; outside the time of scanning the information function has the value 0, because during such periods no information is transmitted. The period of the carrier function equals the period of rotation of the switch. The number of information transmitters which can be contacted at each revolution of the switch is limited by two factors. First, each sender must have a certain minimum scanning time, because the voltage on the transmission line must be connected to this transmitter initially at the voltage value at the transmitter and, after the switching off of one transmitter and before the switching on of another, must drop back to zero. On the other hand, during the time the switch takes to rotate, the voltage values of the various transmitters must remain substantially unchanged.

In the frequency-multiplex system, the information function normally requires within the frequency band a predetermined band width $\Delta f$. For instance, the signals of teletype machines occupy the band from 0 to 120 cycles per second. It is possible to shift the signals of several teletype machines in the voice frequency band of 300 to 3,400 cycles, by modulating the individual signals to a higher frequency, in each case to one of several harmonic vibrations, which are separated from each other by 120 cycles. It is also possible to shift several such voice-frequency bands to still higher frequencies, as by taking bands of 3,400 cycles width between 10 and 100 kilocycles.

The possibility of thus modulating the harmonic vibrations stems from the multiplication theorem of the functions $\cos\omega t$ and $\sin\omega t$. This is:

$$2\cos\omega_0 t\cdot\cos\omega t=\cos(\omega_0-\omega)t+\cos(\omega_0+\omega)t. \quad (1)$$

The vibration $\cos\omega t$ is transformed by modulation of the oscillation $\cos\omega_0 t$ into two oscillations $\cos(\omega_0-\omega)t$ and $\cos(\omega_0+\omega)t$. In this way at each frequency shift the band width of the signal is doubled. In order to be able to use practicably a carrier-frequency system, this doubling must be prevented. The usual way of doing this is to use a filter, for example a band filter which will suppress $\cos(\omega_0-\omega)t$.

Another system involves adding to the function (1) the function $$-2\sin\omega t\cdot\sin\omega_0 t=-\cos(\omega_0-\omega)t+\cos(\omega_0+\omega)t.$$

In this way also the portion $\cos(\omega_0-\omega)t$ is suppressed. This second procedure requires a phase-changing filter which converts $\cos\omega t$ to $\sin\omega t$.

Apart from the question of weight, filters have the disadvantage of producing phase distortion. In telephone transmission this is not particularly important, because the human ear is rather tolerant to phase distortion. On the other hand, telegraphic signals such as are used in teletype or data transmitter are very sensitive to phase distortions. This means, in practice, that it is almost impossible to use the band width of a carrier frequency system with filters for telegraphic transmission.

Frequency and time multiplexing are two extreme examples of a more general method referred to as orthogonal multiplexing. Orthogonal multiplexing uses general systems of orthogonal functions of which sine/cosine functions and block pulses are special examples.

Orthogonal multiplexing based on Walsh functions is referred to as sequency multiplexing as is discussed in U.S. Pat. No. 3,470,324. These functions are ideal if the number of channels to be multiplexed is a power of 2. Since it is usual to multiplex 12 telephone channels into one group, it is necessary to use a somewhat different system of two-valued functions which will be referred to as the functions pal$(j,\theta)$ in honor of Paley.

SUMMARY OF THE INVENTION

It is an object of the present invention to provide a method and apparatus for combining the strong points of sequency and frequency multiplexing.

It is a further object of the present invention to provide a method and apparatus compatible with a 12 channel multiplexing standard.

It is a further object of the present invention that the inventive multiplexing apparatus being capable of being implemented by present binary semiconductor technology.

According to a broad aspect of the invention there is provided a method for the transmission of information by carrier waves comprising the steps of multiplying each of a plurality of signals by a different Paley function, adding said multiplied signals to form a multiplexed signal, transmitting said multiplexed signal to a receiver, receiving said multiplexed signal in a receiver, and reconverting said multiplexed signal according to Paley functions into the original plurality of signals.

The above and other objects of the invention will be better understood from the following detailed description taken in conjunction with the accompanying drawings in which:

DESCRIPTION OF THE PREFERRED EMBODIMENTS

Figure 1:
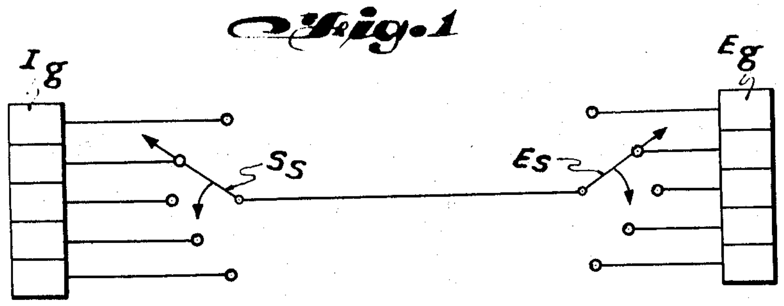
FIG. 1 represents an explanation of a time multiplex system.
Figure 1A:
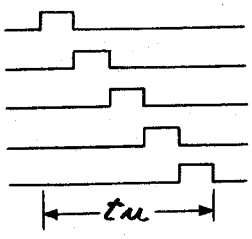
FIG. 1*a* is an explanatory diagram related to FIG. 1.
Figure 2:
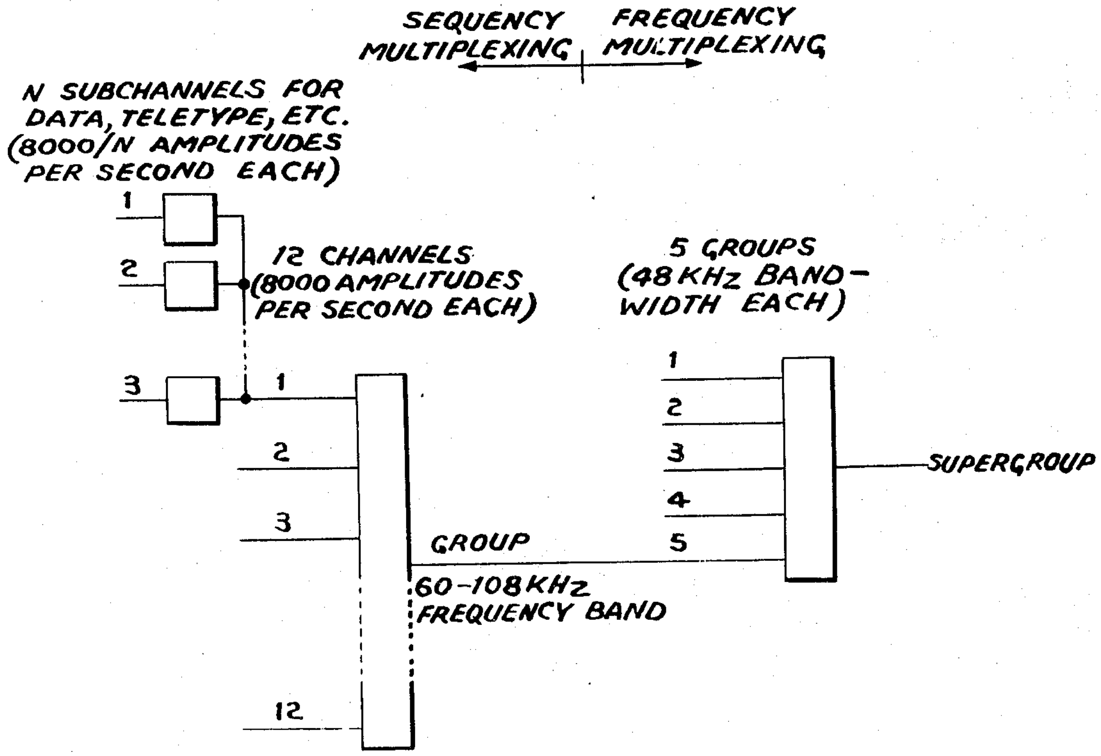
FIG. 2 shows an arrangement wherein a sequency/frequency multiplex system is interfacing at the group level.

FIG. 2 shows an arrangement whereby frequency and sequency multiplexing are combined by frequency multiplexing above the group level and sequency multiplexing below. The term sequency multiplexing is used when two-valued functions are used as carriers that cannot be separated by time sampling (in which case the term "time multiplexing" is used). The term sequency multiplexing is used in analogy to frequency multiplexing, frequency multiplexing applying to carriers with sinusoidal functions.

The combination of several groups originating at different locations into a supergroup thus does not require synchronization between the groups. Equipment costs are less important above the group level than below since they are shared by at least 12 channels. Furthermore, signal distortions caused by frequency filters are less important above the group level since such distortions are caused, at present, mainly by the single-sideband filters of the channels.

Sequency multiplexing below the group level offers the advantage of reduced costs and reduced distortions. Furthermore, the size of the equipment is reduced and the need for individual tuning of filters is eliminated. Synchronization is required for all signals, but this is not a problem since the multiplexing equipment below the group level will be either on the same rack or at least in the same room. The amplitude distribution of the group signal must be approximately Gaussian to be compatible with existing frequency-multiplex equipment above the group level; this requirement cannot be met by time multiplexing if binary signals are to be transmitted, and would generally require companders if analog signals are to be transmitted.

As shown in FIG. 2, the subdivision of a group into 12 channels is retained even though the number 12 leads to somewhat more complicated circuits than would a power of two. The further subdivision of a channel into N subchannels is done again by sequency multiplexing. Typical values for N for teletype transmission are 128, 144 or 192.

Figure 3:
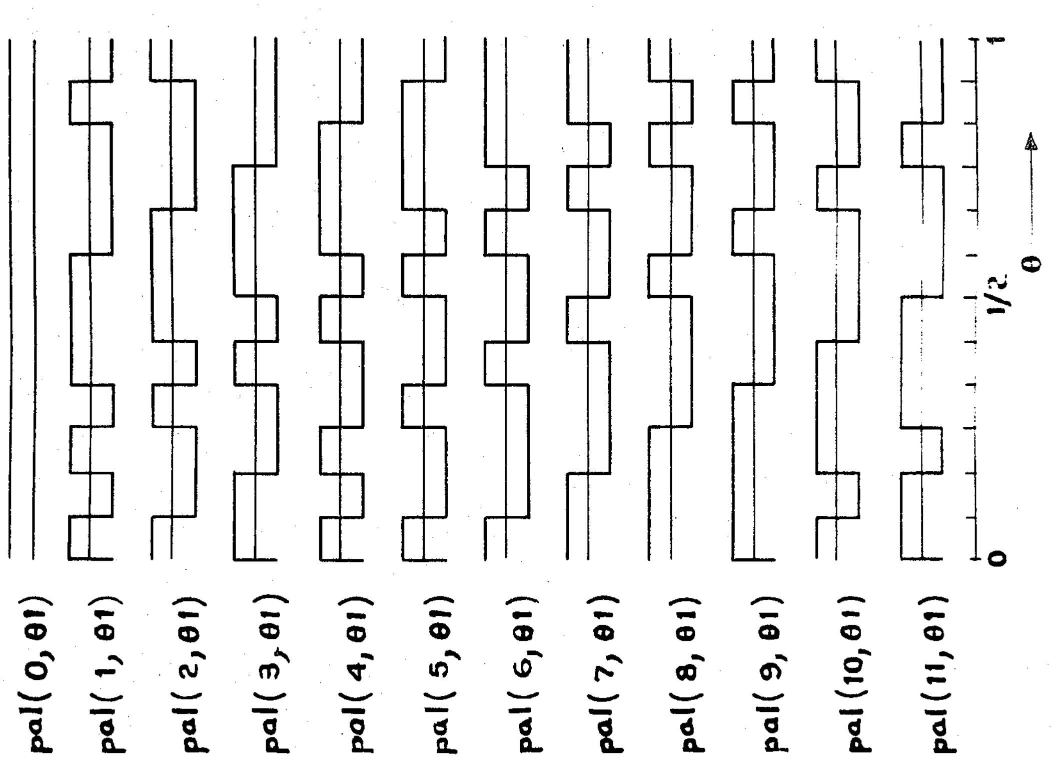
FIG. 3 shows waveforms corresponding to 12 orthogonal Paley functions.

The Walsh functions may be derived from Hadamard matrices of rank $2^n$. There are, however, Hadamard matrices of rank different from $2^n$. A matrix of rank 12 was first reported by Paley. A more complete discussion of a Hadamard matrix of rank 12 can be found in R.E.A.C. Paley, Journal of Mathematics and Physics, Vol. 12 (1933), pages 311-320. The actual matrix is shown on page 313 of this reference. FIG. 3 shows the 12 functions derived from this matrix. It suffices to say that the functions pal($j$,$\theta$) are not quite as convenient as the Walsh functions, but they are compatible with the 12 channel multiplexing standard. The layout of the circuits is planned so that the functions pal($j$,$\theta$) can be replaced by Walsh functions whenever 4, 8, 16, 32, . . . channels are to be multiplexed rather than 12.

Figure 4:
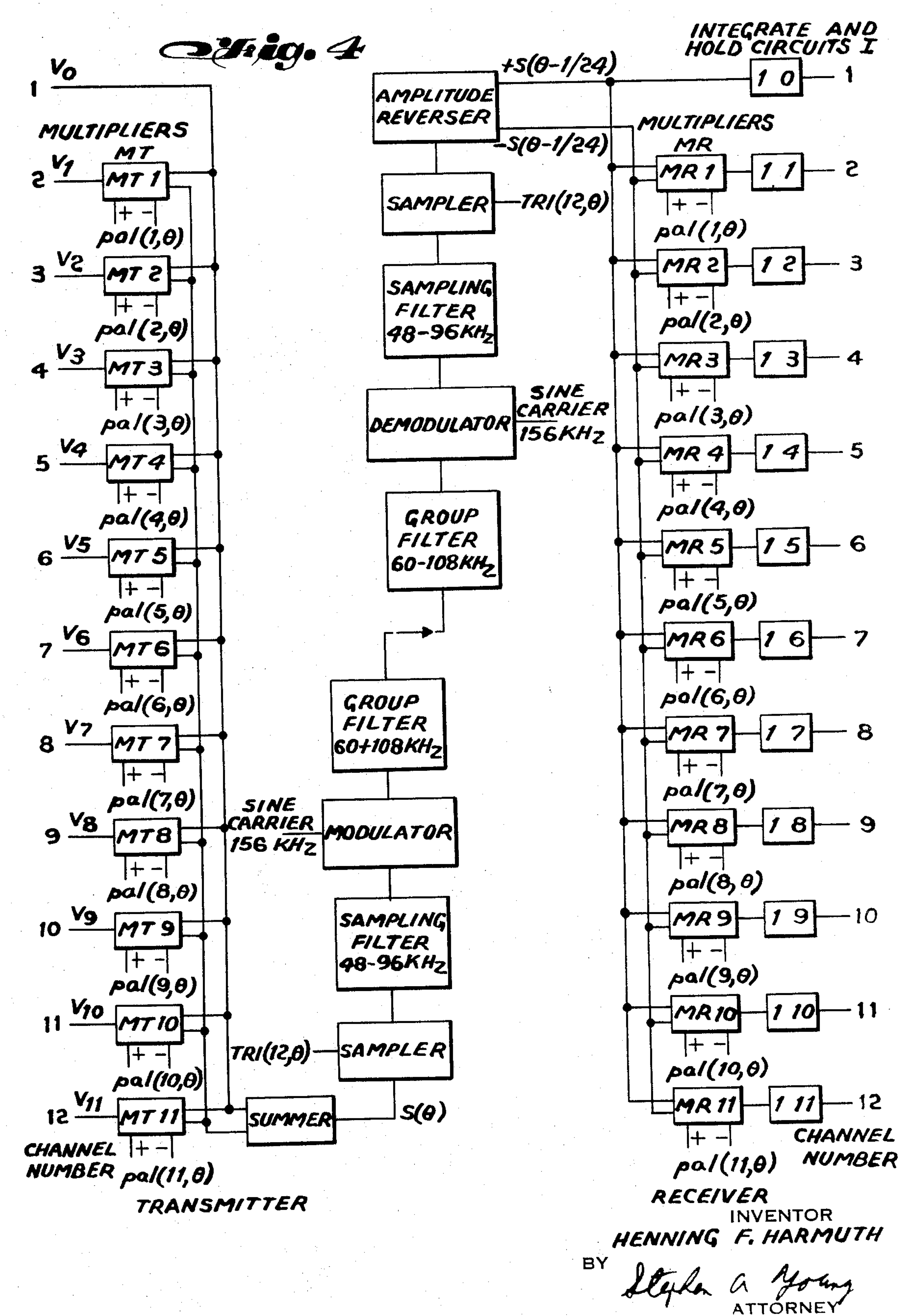
FIG. 4 is a block diagram for a 12 channel sequency multiplex system.

FIG. 4 shows a block diagram for a 12 channel sequency multiplex system.

Figure 5:
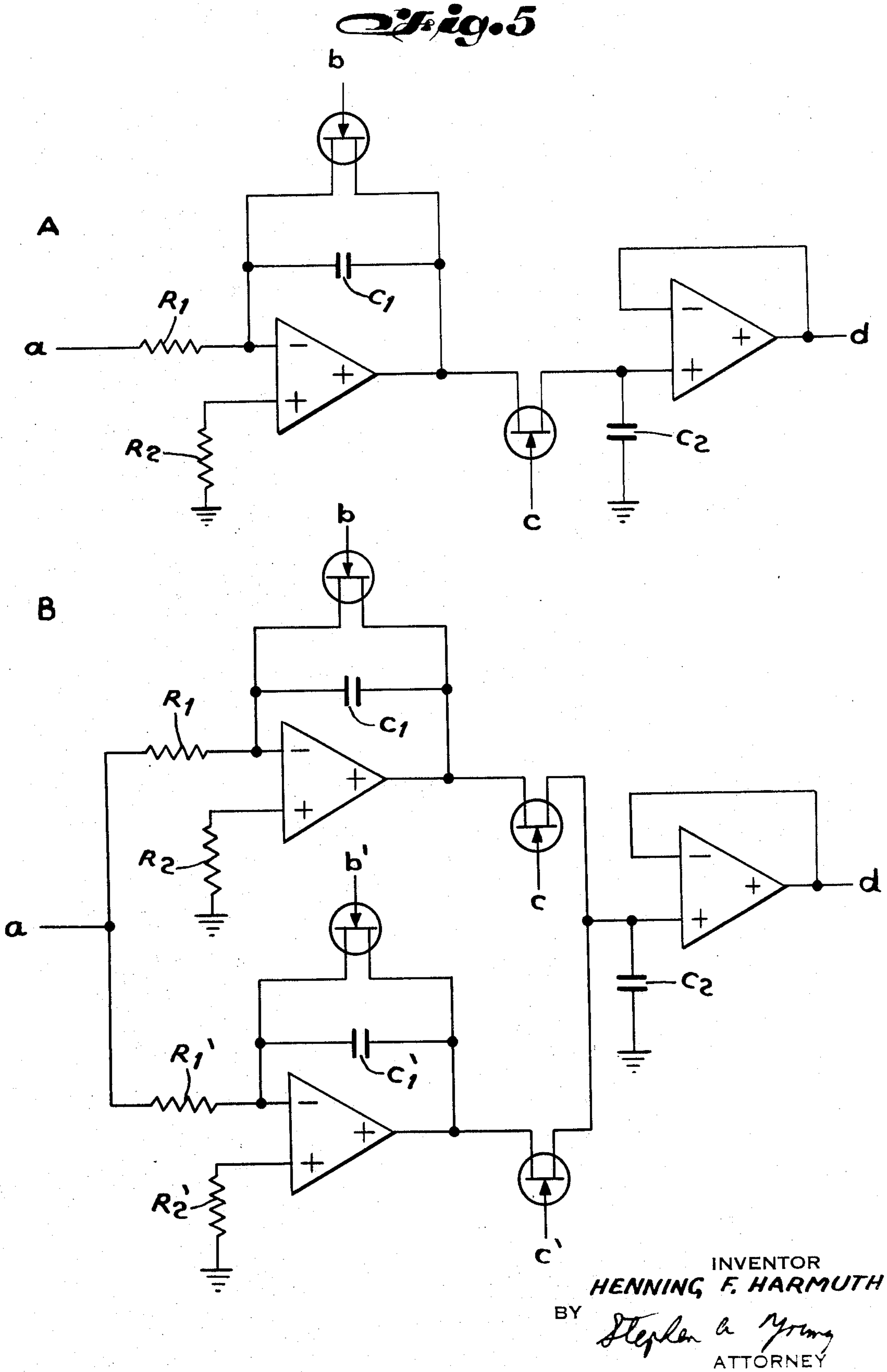
FIGS. 5*a* and 5*b* show sequency low pass filters.

It is assumed that 12 voltages, $V_0$ to $V_{11}$, having a constant value during intervals $0 \leq t < 125\ \mu s$, $125\ \mu s \leq t < 250\ \mu s$, etc. are fed to the channel inputs. These voltages may be analog or quantized; in particular they may be quantized to two values, +V and −V. Modems are required to transform the voltage supplied by the signal source into this form. If the signal source is a microphone, the modem consists of a sequency low-pass filter as shown in FIG. 5. If the signal source is a teletypewriter, the modem consists of sequency multiplexing equipment similar to the one discussed here, but working much slower and multiplexing 128, 144 or 192 teletype channels into one telephone channel.

Figure 6:
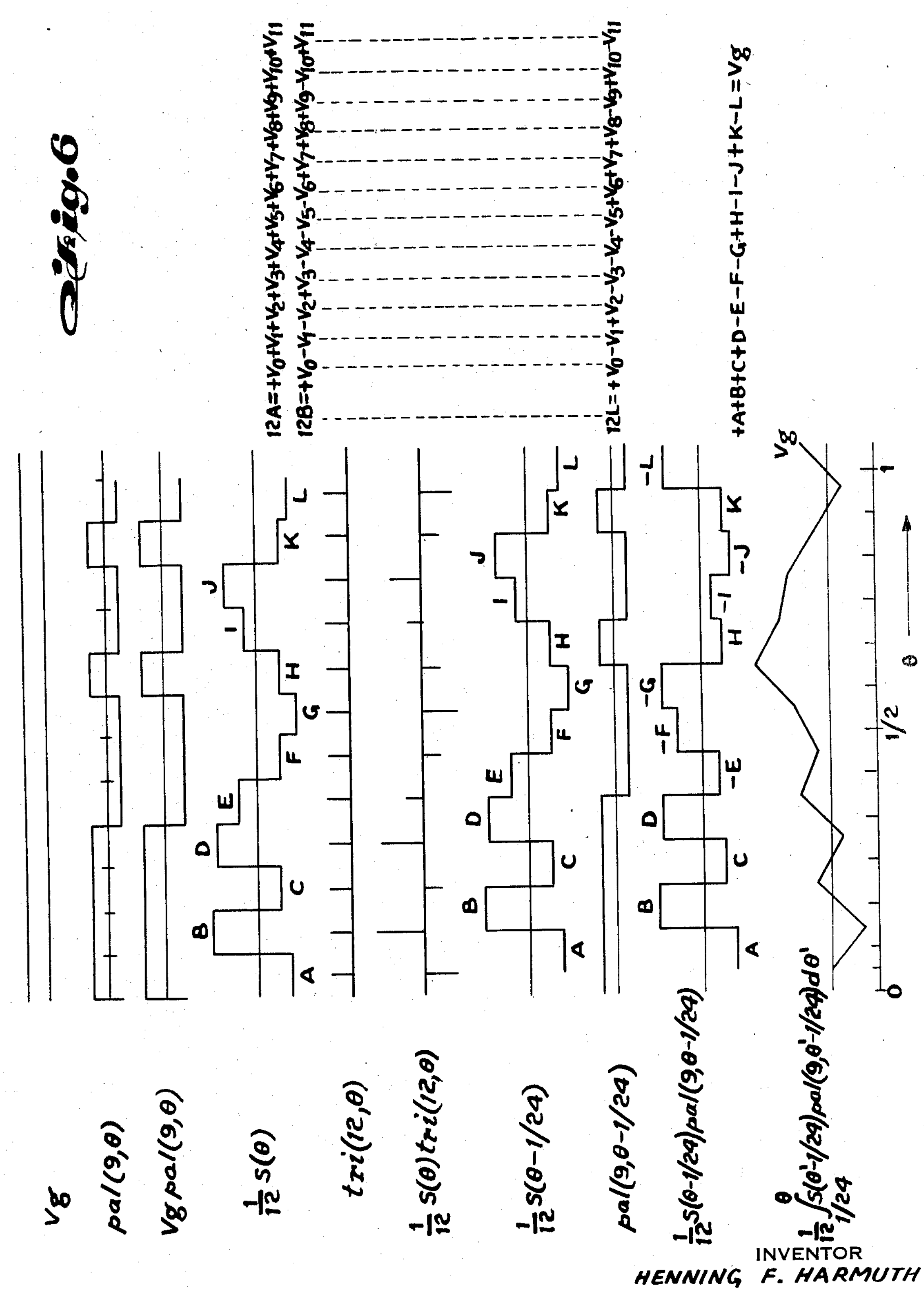
FIG. 6 shows a series of waveforms that aid in the explanation of FIG. 4.

For an explanation of the multiplexing process, refer to FIG. 6. The voltage $V_9$ is shown on top. It is constant in the interval $0 \leq \theta < 1$ or $0 \leq t < 125\ \mu s$ for $\theta = t/T$, $T = 125\ \mu s$. This voltage is multiplied by the carrier pal(9,$\theta$) in the multiplier MT9 of FIG. 4. The resulting voltage $V_9$ pal(9,$\theta$) is fed to the summing amplifier SU. Two wires connect each multiplier with the summing amplifier SU since the multipliers are actually single-pole, double-throw switches as explained later.

The sum of the output voltages of the 11 multipliers and the voltage $V_0$ is denoted by S($\theta$). A typical voltage S($\theta$) is shown in line 4 of FIG. 6. The 12 independent amplitudes of S($\theta$) are denoted by A,B, . . . L. How these amplitudes are derived from the input voltages $V_0 \ldots V_{11}$ is shown on the right hand side of FIG. 4. The sequency multiplexing process ends here.

The step function S($\theta$) is not particularly suited for transmission through a frequency band-limited channel. To make S($\theta$) frequency-limited, one may sample it by the trigger function tri(12,$\theta$) shown in FIG. 6, obtaining the very narrow pulses S($\theta$) tri(12,$\theta$). Passing these through a frequency low-pass or band-pass filter produces a frequency band-limited signal that contains the same information as S($\theta$). The process of converting a (sequency band-limited) step function into a frequency band-limited function and the reconversion will be discussed further. For the moment, let us assume that the function S($\theta$) tri(12,$\theta$) is produced at the transmitter and is made available at the receiver. By a holding circuit, one may convert S($\theta$) tri(12,$\theta$) into the delayed function S($\theta$ − 1/24) shown in FIG. 6.

Let (1/12) S($\theta$ − 1/24) be multiplied by pal(9,$\theta$ − 1/24) as shown in FIG. 6. The sum of the resulting amplitudes A,B . . . , −L yields the voltage $V_9$ transmitted by the carrier pal(9,$\theta$). A practical way to produce this sum is to integrate (1/12) S($\theta$ − 1/24) pal(9,$\theta$ − 1/24) from $\theta$ = 1/24 to $\theta$ = 1 + 1/24, since all steps have the same width. The multiplication is done in FIG. 4 by the amplitude-reversing amplifier AR, which produces the voltages S($\theta$ − 1/24) and −S($\theta$ − 1/24), and the multipliers MR, which are single-pole, double-throw switches. The output voltages of the multipliers are fed to integrate-and-hold circuits I that integrate over the time interval 1/24 $\theta$<1 +1/24, sample the integrated voltage at the time $\theta$ = 1 + 1/24, and hold it from $\theta$ = 1 + 1/24 to $\theta$ = 2 +1/24.

Figure 7:
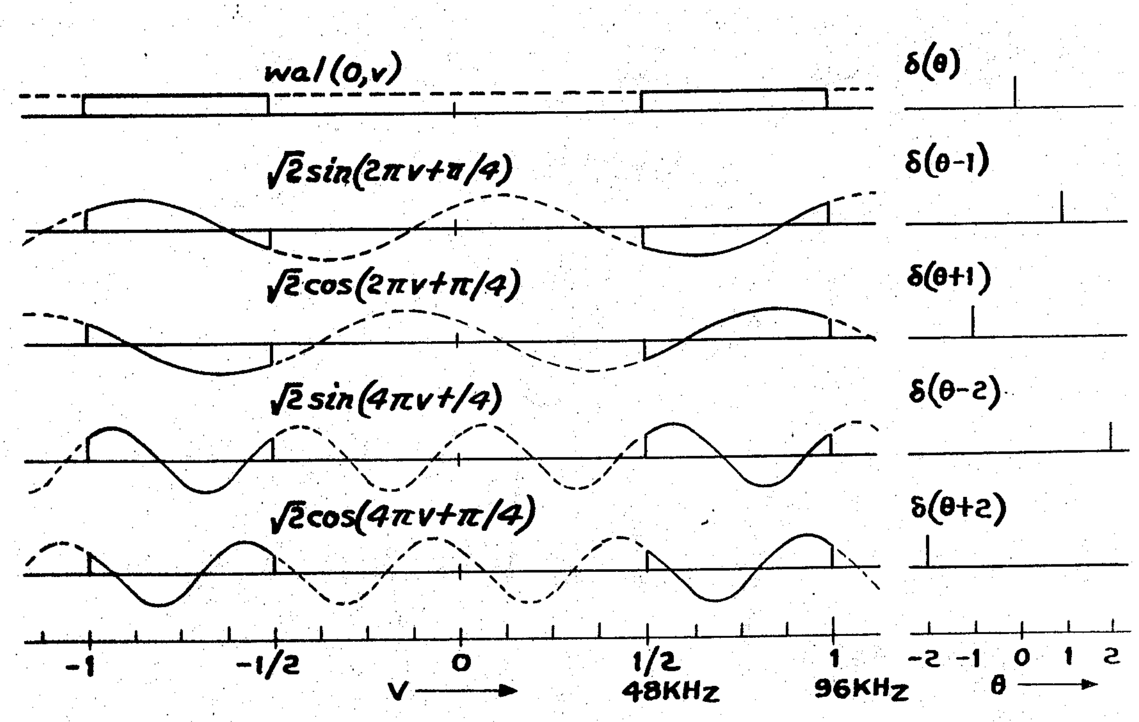
FIG. 7 represents a graphic illustration of delta functions and their Fourier transforms.

Consider the delta pulses $\delta(\theta+i)$ for $i = 0, \pm1, \pm2, \ldots$ as shown in FIG. 7. The pulses are infinitely high and the integral $$\int_{-\infty}^{\infty} \delta(\theta+i)\,d\theta \text{ epuals } 1.$$

It is well known that the frequency power spectrum of any one of these pulses is constant for all values of frequency. We need, however, not the power spectrum but the Fourier transform. Using a variety of the Fourier transform well-suited for investigations involving orthogonal functions, one obtains:

$$\int_{-\infty}^{\infty} \delta(\theta)\,(\cos 2\pi\nu\theta + \sin 2\pi\nu\theta)\,d\theta = \text{wal }(0,\nu) = 1 \tag{3}$$

$$\int_{-\infty}^{\infty} \delta(\theta-i)\,(\cos 2\pi\nu\theta + \sin 2\pi\nu\theta)\,d\theta = \sqrt{2}\,\sin\,(2\pi i\nu + \pi/4) \tag{4}$$

$$\int_{-\infty}^{\infty} \delta(\theta-1)\,(\cos 2\pi\nu\theta + \sin 2\pi\nu\theta)\,d\theta = \sqrt{2}\,\cos\,(2\pi i\nu + \pi/4) \tag{5}$$

$i = 1, 2, \ldots, \theta = t/T', \nu = fT'$.

Due to the relation $$\cos(2\pi i\nu + \pi/4) = \sin(-2\pi i\nu + \pi/4) \tag{6}$$

one may substitute one equation for the three Equations (3) to (5):

$$\int_{-\infty}^{\infty} \delta(\theta-i)\,(\cos 2\pi\nu\theta + \sin 2\pi\nu\theta)\,d\theta = \sqrt{2}\,\sin\,(2\pi i\nu + \pi/4) \tag{7}$$

$i = \ldots -2, -1, 0, +1, +2 \ldots$

The functions $\delta(\theta+i)$ for $i = -2, -1, 0, 1, 2$, and their Fourier transforms are shown in FIG. 7.

If all oscillations with frequency $\nu$ larger than ½ are suppressed by a low-pass filter, one obtains the following inverse transform from (7):

$$\int_{-1/2}^{1/2} \sqrt{2}\,\sin\,(2\pi i\nu + \pi/4))\cos 2\pi\nu\theta + \sin 2\pi\nu\theta)\,d\nu = \frac{\sin \pi(\theta-i)}{\pi(\theta-i)} \tag{8}$$

This is the well-known result that the function $\delta(\theta-i)$ is transformed into the function $[\sin\pi(\theta-i)]/\pi(\theta-i)$ by a frequency low-pass filter with cut-off frequency ½. A more general case is required here: the function $\delta(\theta-i)$ shall be applied to a bandpass filter with lower cut-off frequency $\nu_0$ and upper cut-off frequency $\nu_0 + ½$. The following inverse transform is obtained in the place of (8):

$$\int_{-(\nu_0+\frac{1}{2})}^{-\nu_0} \sqrt{2} \sin (2\pi i\nu + \pi/4)(\cos 2\pi\nu\theta + \sin 2\pi\nu\theta)d\nu + \int_{\nu_0}^{(\nu_0+\frac{1}{2})} \sqrt{2} \sin (2\pi i\nu + \pi/4)(\cos 2\pi\nu\theta + \sin 2\pi\nu\theta)d\nu =$$

$$\cos 2\pi\nu_0(\theta-i)\frac{\sin \pi(\theta-i)}{\pi(\theta-i)} + \cos \pi(\theta-i)\frac{\sin 2\pi\nu_0(\theta-i)}{\pi(\theta-i)} - \frac{\sin 2\pi\nu_0(\theta-i)}{\pi(\theta-i)} = f(\nu_0,\theta-i) \quad (9)$$

For $\nu_0 = 0$ one obtains again the result (8). A closer study shows that other useful results are obtained for $\nu_0 = ½, 1, 3/2, \ldots$ For instance, $\nu_0 = ½$ yields:

$$f(1/2,\theta-i) = \frac{\sin 2\pi(\theta-i)}{\pi(\theta-i)} - \frac{\sin \pi(\theta-i)}{\pi(\theta-i)} \quad (10)$$

Figure 8:
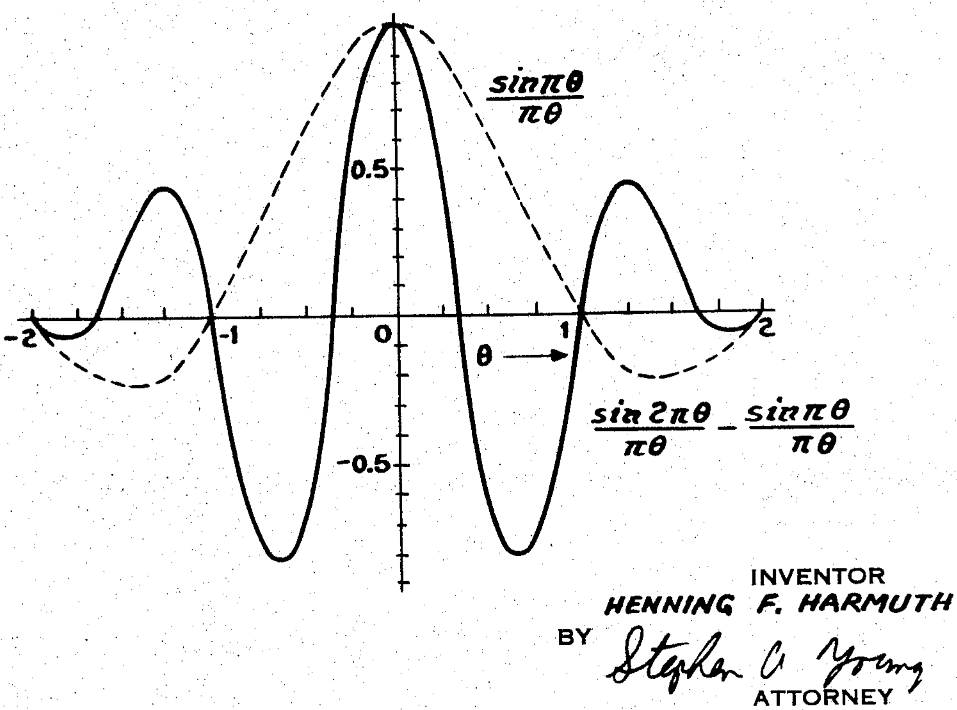
FIG. 8 represents a graphic illustration of a delta function after passing through frequency filters.

This function is shown for $i=0$ by the solid line in FIG. 8. It has zeros at the points $i = \pm 1, \pm 2, \ldots$ just as the function $[\sin\pi(\theta-i)]/\pi(\theta-i)$ which is shown by the dashed line. Hence, sampling a signal with the amplitudes $A(i)$ at the times $\theta=i$ and passing the samples through a bandpass filter with passband $½ \leq \nu \leq 1$ yields at the filter output the functions $A(i)f(½, \theta-i)$; sampling the output voltage of the filter at the times $\theta=i$ yields again the original amplitude samples $A(i)$, since all functions $f(½,\theta\alpha-k)$ are zero for $\theta=i$, $k\neq i$, while the function $f(½,\theta-i)$ equals 1.

For practical values assume that 12 telephone channels have been sequency multiplexed. The step function $S(\theta)$ in FIG. 6 has then steps of $T' = 125/12 = 10.416$ μs duration. The function must thus be sampled every 10.416 microseconds or 96,000 times per second. The frequency band $½ \leq \nu = fT' \leq 1$ becomes $½T' \leq f \leq 1/T'$ or 48 kHz $\leq f \leq$ 96 kHz. This is unfortunately not the usual band of the group filter and the signal has to be shifted by 12 kHz to pass through the group filter.

Figure 9:
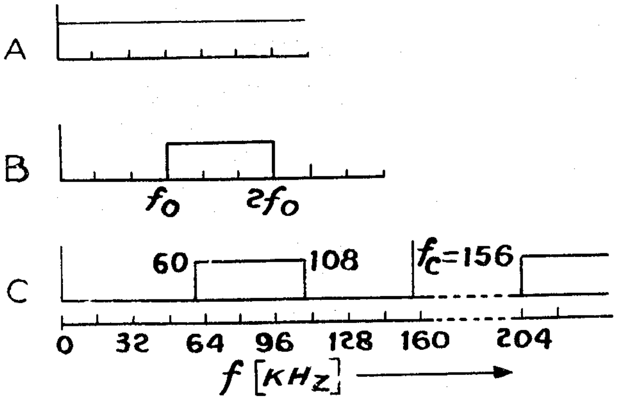
FIG. 9 shows the power spectrum and frequency shift of a delta pulse.

The sequency multiplex signal $S(\theta)$ of FIG. 6 may be shifted into the group band 60 kHz $\leq f \leq$ 108 kHz. Line A of FIG. 9 shows the frequency power spectrum of a delta pulse used for sampling. Using sampling filter SF with pass band 48 kHz $\leq f \leq$ 96 kHz, the power spectrum B is obtained from the spectrum A. Shifting the signal into the band 60 kHz $\leq f \leq$ 108 kHz is accomplished by modulating a carrier with frequency $f_c = 156$ kHz and using the lower side band as shown by the power spectrum C in FIG. 9. The upper side band starting at 204 kHz is suppressed by group filter GF.

Figure 10:
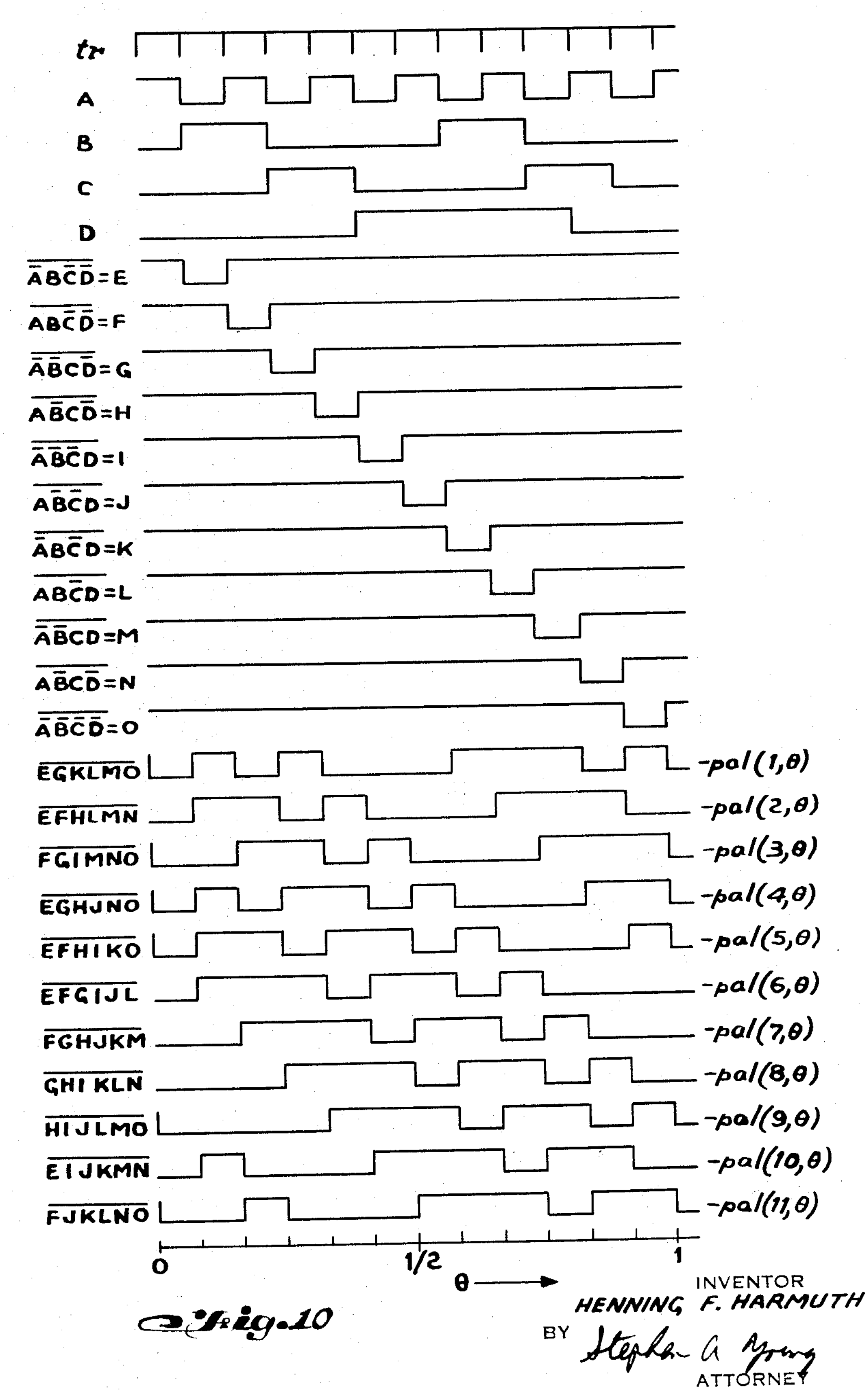
FIG. 10 is a timing diagram for a generator of the carriers pal$(1,\theta)$ to pal$(11,\theta)$.
Figure 11:
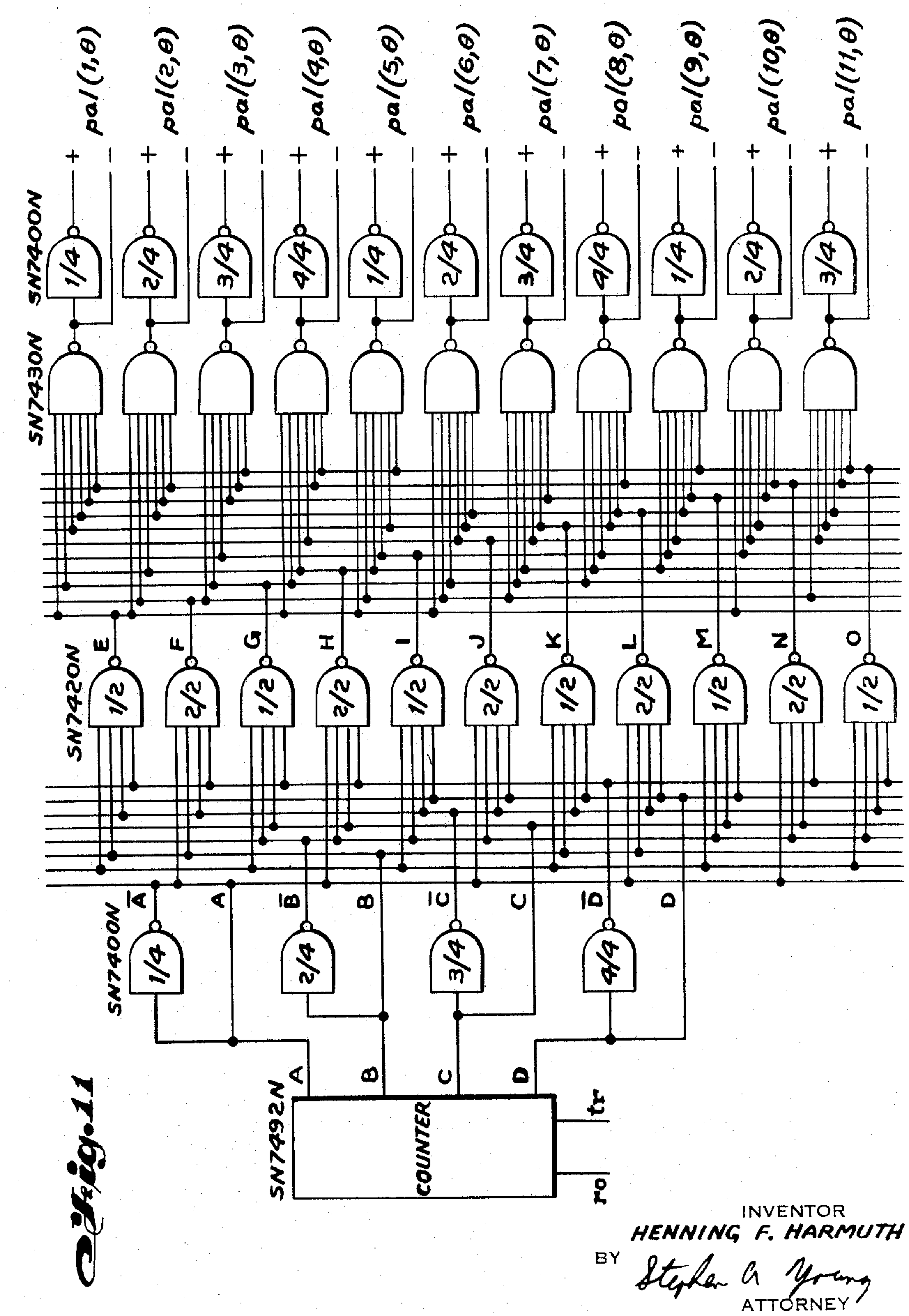
FIG. 11 shows a generator for the functions $\pm$ pal$(1,\theta)$ to $\pm$ pal$(11,\theta$.

The multiplexing system discussed here requires the generation of the functions $pal(i,\theta)$ of FIG. 3. The first function $pal(0,\theta)$, being DC, poses no problem. A possible generator for the other functions is discussed with reference to FIG. 10. The trigger pulses produce the pulses A to D at the outputs of the scale 12 counter SN 7492N (Texas Instruments) shown in FIG. 11. Various NAND gates produce the pulses E to 0 from the pulses A to D as shown. Another set of NAND gates produces the functions $-pal(1,\theta)$ to $-pal(11,\theta)$. This circuit produces the output voltages $+pal(i,\theta)$ and $-pal(i,\theta)$ required by the circuit of FIG. 4.

Figure 12A:
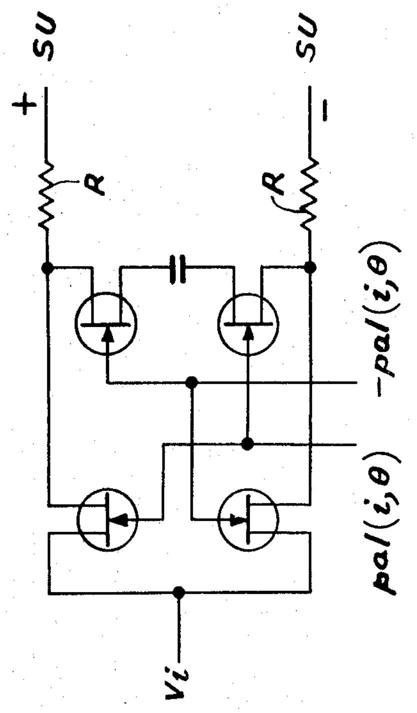
FIG. 12*a* gives an example of a multiplier circuit.
Figure 12B:
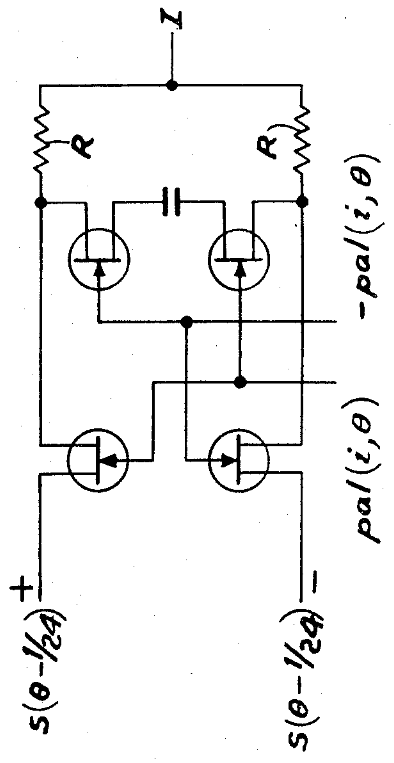
FIG. 12*b* is another example of a multiplier circuit.

A possible version of the multipliers MT of FIG. 4 is shown in FIG. 12A, while FIG. 12B shows a possible version of the multipliers MR.

FIG. 5A shows a simple version of an integrate-and-hold circuit I of FIG. 4. This is simply a sequency low-pass filter. The main limitation of this circuit is that the field effect transistors have a resistance of several hundred ohms when conducting. Hence, the resetting of the integrator requires at least 1 percent of the integration time. As a result, the crosstalk attenuation achieved when using this circuit is typically worse than −30db. FIG. 13B shows a much better circuit. The two integrators are used alternately, avoiding the requirement for fast resetting. The main limitation is now that capacitor $C_2$ has to have a small value in order that it can be fully charged in a short time through the field-effect transistors. The small value of $C_2$ causes its voltage to drop relatively fast despite the buffer amplifier. This circuit yields some −40 db to −50 db crosstalk attenuation.

It is to be understood that the foregoing description of specific examples of this invention is made by way of example only and is not to be considered as a limitation on its scope.

I claim:

1. A method for the transmission of information by carrier waves comprising the steps of:
   - multiplying each of a plurality of signals by a different Paley function;
   - adding said multiplied signals to form a multiplexed signal;
   - sampling said multiplexed signal to form trigger pulses;
   - passing said trigger pulses through a bandpass filter to produce a frequency band limited signal;
   - transmitting said frequency band limited signal to a receiver;
   - receiving said frequency band limited signal in a receiver and reconverting said frequency band limited signal according to Paley functions into the original plurality of signals.

2. A method according to claim 1 further including the step of shifting the frequency of said frequency band limited signal.

3. An apparatus for the transmission of information by carrier waves, comprising:
   - a first source of information signals to be transmitted;
   - a second source of signals representing Paley functions;
   - means coupled to said first and second source for multiplying each f said first source of signals by a different one of said second source of signals representing Paley functions;
   - means for adding the outputs of said multiplying means to form a sequency multiplexed signal;
   - means for converting said multiplexed signal into a frequency band limited signal;
   - means for receiving said frequency band limited signal;
   - means coupled to said band limited signal for reconverting said band limited signal into said sequency multiplexed signal; and
   - means for reconverting said sequency multiplexed signal back into said information signals.

4. An apparatus according to claim 3 wherein said reconverting means includes integrating means coupled to said sequency multiplexed signal to produce the original information signals.

* * * * *